(12) United States Patent
Davis et al.

(10) Patent No.: US 7,716,650 B2
(45) Date of Patent: May 11, 2010

(54) NON-DESTRUCTIVE DEBUGGING FOR ADD-INS

(75) Inventors: Jackson Davis, Bothell, WA (US); Adrian Stevenson Miller, Redmond, WA (US); Eric Hyde Carter, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 935 days.

(21) Appl. No.: 11/142,803

(22) Filed: Jun. 1, 2005

(65) Prior Publication Data
US 2006/0277527 A1    Dec. 7, 2006

(51) Int. Cl.
*G06F 9/44* (2006.01)
(52) U.S. Cl. .................. 717/129; 717/131
(58) Field of Classification Search .......... 717/124–135
See application file for complete search history.

(56) References Cited

U.S. PATENT DOCUMENTS

| | | | |
|---|---|---|---|
| 5,903,728 A * | 5/1999 | Semenzato | 709/217 |
| 6,353,923 B1 * | 3/2002 | Bogle et al. | 717/128 |
| 6,718,485 B1 * | 4/2004 | Reiser | 714/38 |
| 6,782,531 B2 * | 8/2004 | Young | 717/130 |
| 6,895,578 B1 * | 5/2005 | Kolawa et al. | 717/130 |
| 7,165,241 B2 * | 1/2007 | Manda et al. | 717/124 |
| 7,321,988 B2 * | 1/2008 | Guo et al. | 714/38 |
| 7,343,591 B2 * | 3/2008 | Szewerenko et al. | 717/134 |
| 7,367,025 B1 * | 4/2008 | Nikolov et al. | 717/158 |
| 7,370,320 B1 * | 5/2008 | Grossman et al. | 717/131 |
| 2002/0087949 A1 * | 7/2002 | Golender et al. | 717/124 |
| 2003/0088854 A1 * | 5/2003 | Wygodny et al. | 717/130 |
| 2005/0081192 A1 * | 4/2005 | DeLine et al. | 717/126 |

* cited by examiner

*Primary Examiner*—Wei Y Zhen
*Assistant Examiner*—Matthew J Brophy
(74) *Attorney, Agent, or Firm*—Woodcock Washburn LLP (57) ABSTRACT

Methods and systems for debugging add-ins using a non-destructive approach. Add-ins are hosted, not stand-alone components, that run in a host application. The add-ins are loaded into an isolated environment so they can be debugged and stopped without affecting the host application. This prevents termination of the host application at arbitrary times. In addition, the host application can refresh itself when an add-in is stepped through in the debugger. The present invention also allows the add-in developer to interact with the host application during a debugging session even when the add-in is stopped at a breakpoint.

20 Claims, 6 Drawing Sheets

NON-DESTRUCTIVE DEBUGGING FOR ADD-INS

FIELD OF THE INVENTION

This invention relates in general to the field of software development. More particularly, this invention relates to a system and method for debugging add-ins for business applications that provides for debugging of the add-in without adversely affecting the host business application.

BACKGROUND OF THE INVENTION

It is common place to extend the functionality of an existing application such as Microsoft Excel by developing an "add-in." An add-in is a component that the host application loads when it is needed, such as when the host application starts up or when a particular document is loaded by the host application. An add-in runs in-process with the host application rather than running in a separate process.

To launch the add-in, a user launches the host application for which the add-in has been created. The host application detects and loads registered add-ins at the appropriate time, such as at startup or when a particular document is opened. An add-in can customize the host application in multiple ways. Two common examples are that an add-in can add new menu commands, and it can modify the way the host application performs a particular operation like saving a document or printing a document.

Typically, an add-in is not written by the creators of the host application, but by third party developers that want to extend the functionality of the host application. An add-in can be created with development tools such as MICROSOFT VISUAL STUDIO .NET 2005. When a developer debugs an add-in, the developer starts the host application under a debugger such as VISUAL STUDIO .NET 2005 and attaches to the host application process because the add-in does not run in its own process space.

The above process for debugging add-ins leads to problems and a poor user experience. For example, when a developer wants to stop the add-in, the developer has to kill the host application that is hosting the add-in. For example, a developer might be debugging an add-in that is loaded within Microsoft Excel. The developer attaches the debugger to the Microsoft Excel process. If the developer is stepping through the add-in and reaches a line of code that the developer does not want to execute, the developer must stop the debugger which in turn kills the Excel process. Host applications such as MICROSOFT Excel and MICROSOFT Word were not designed to be killed at arbitrary times. These host applications may have a file open or be in the process of printing a document or be doing any number of other things that if stopped arbitrarily could cause data loss.

Another problem is that the state the host application is in is actually part of the state of the add-in being debugged. Conventional debugging tools do not show changes in the state of the host application, which makes it nearly impossible to debug host data without printing that data in another location such as a message box or console window. For example, an add-in may load into MICROSOFT Word, and when invoked the add-in searches for particular acronyms in the documents and highlights them. Conventionally, it is not possible for the developer to step through the add-in code line by line in the debugger while simultaneously viewing the changes in the document as the code is executed. The conventional debugging experience is limited, in that when stepping through add-in code if the user is stopped at a breakpoint, the host application is also stopped and is unable to refresh itself. This leads to an experience where stepping through add-in code yields no refresh of the host application and the developer cannot ascertain the effect of code written in the add-in.

Yet another problem occurs when the developer is stopped at a breakpoint in the add-in code and the developer desires to be able to interact with the host application. Conventional debuggers do not provide for this either. For example, the developer may stop at a breakpoint in add-in code where the next line of add-in code will read the value of a cell in a MICROSOFT Excel worksheet. When the breakpoint is hit, however, the developer may realize that there is not a value in the cell that is about to be read by the add-in. Thus, it would be beneficial if MICROSOFT Excel was responsive even though it is stopped at a breakpoint in the add-in code. This way the developer could enter a value in the cell and then continue the add-in code rather than have to restart the debugging session as you have to today.

Therefore, there is a need for a system of debugging add-ins that are hosted by host applications in a non-destructive manner such that the add-in can be debugged without adversely affecting the host application. The present invention provides solutions to this and other limitations in the prior art.

SUMMARY OF THE INVENTION

The present invention is directed to methods and systems for debugging add-ins using a non-destructive approach. Add-ins are hosted, not stand-alone components, that run in a host application. The add-ins are loaded into an isolated environment so they can be debugged and stopped without affecting the host application. This prevents termination of the host application at arbitrary times. In addition, the host application can refresh itself when an add-in is stepped through in the debugger. The present invention also allows the add-in developer to interact with the host application during a debugging session even when the add-in is stopped at a breakpoint.

In accordance with an aspect of the invention, there is provided a method of non-destructive debugging of an add-in. The method includes starting a debugger; starting a debugee host application; establishing a connection between a debugee controller and a debugger controller; loading the add-in into an isolated environment associated with the debugee host application; raising an event handled by the add-in; and interacting with the add-in independently of the debugee host application.

In accordance with another aspect of the invention, there is provided a system for non-destructive debugging of an add-in. The system includes a debugger, a debugger controller, a host application running on a main thread, and a debugee controller associated with the host application running on a secondary thread. An add-in is loaded by the host application into an isolated environment. The debugger steps through code associated with the add-in independently of the host application.

Additional features and advantages of the invention will be made apparent from the following detailed description of illustrative embodiments that proceeds with reference to the accompanying drawings.

BRIEF DESCRIPTION OF THE DRAWINGS

The foregoing summary, as well as the following detailed description of preferred embodiments, is better understood when read in conjunction with the appended drawings. For the purpose of illustrating the invention, there is shown in the drawings exemplary constructions of the invention; however, the invention is not limited to the specific methods and instrumentalities disclosed. In the drawings.

DETAILED DESCRIPTION OF PREFERRED EMBODIMENTS

Exemplary Computing Environment

Figure 1:
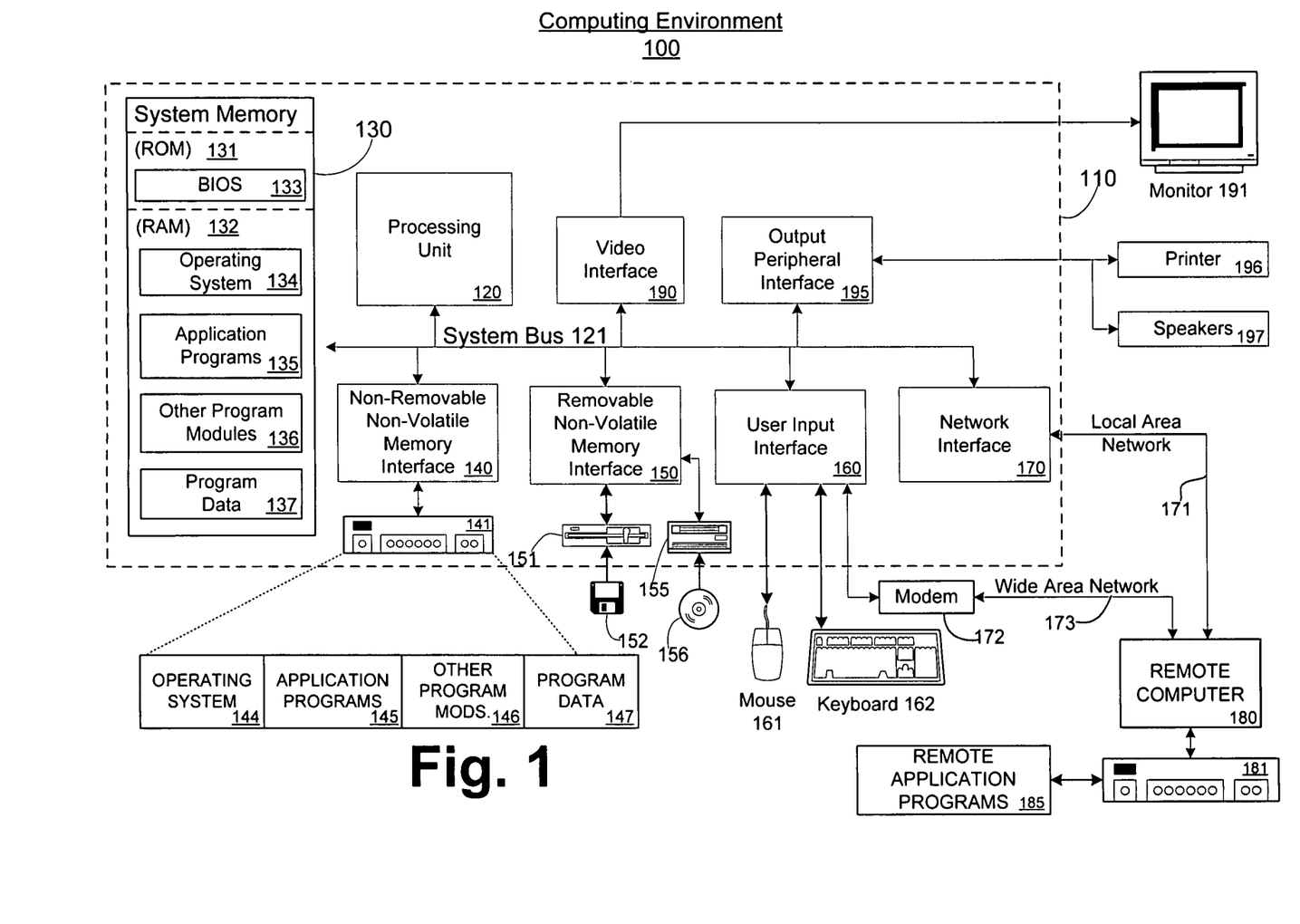
FIG. 1 is a block diagram showing an exemplary computing environment in which aspects of the invention may be implemented.

FIG. 1 illustrates an example of a suitable computing system environment 100 in which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network or other data transmission medium. In a distributed computing environment, program modules and other data may be located in both local and remote computer storage media including memory storage devices.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus).

Computer 110 typically includes a variety of computer readable media. Computer readable media can be any available media that can be accessed by computer 110 and includes both volatile and non-volatile media, removable and non-removable media. By way of example, and not limitation, computer readable media may comprise computer storage media and communication media. Computer storage media includes both volatile and non-volatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or non-volatile memory such as ROM 131 and RAM 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/non-volatile computer storage media. By way of example only, FIG. 1 illustrates a hard disk drive 141 that reads from or writes to non-removable, non-volatile magnetic media, a magnetic disk drive 151 that reads from or writes to a removable, non-volatile magnetic disk 152, and an optical disk drive 155 that reads from or writes to a removable, non-volatile optical disk 156, such as a CD-ROM or other optical media. Other removable/non-removable, volatile/non-volatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media, discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Exemplary Embodiments of Non-Destructive Debugging for Add-Ins

The present invention provides for debugging of add-ins using an advantageous non-destructive approach. Add-ins are hosted, not stand-alone components, and as hosted components it is desirable to debug an add-in without adversely affecting the host application. In addition, add-ins work against and change the state of a host application and it is desirable for that host application to refresh itself when an add-in is being debugged. It is also desirable for an add-in developer to be able to interact with the host application even when stopped on a breakpoint.

The present invention allows add-ins to be debugged and stopped without affecting the host application, eliminating the problems inherent with conventional add-in debugging which may terminate the host application at arbitrary times. The present invention allows the host application to refresh itself when an add-in is stepped through in the debugger. The present invention also allows the add-in developer to interact with the host application during a debugging session even when the add-in is stopped at a breakpoint.

Figure 2:
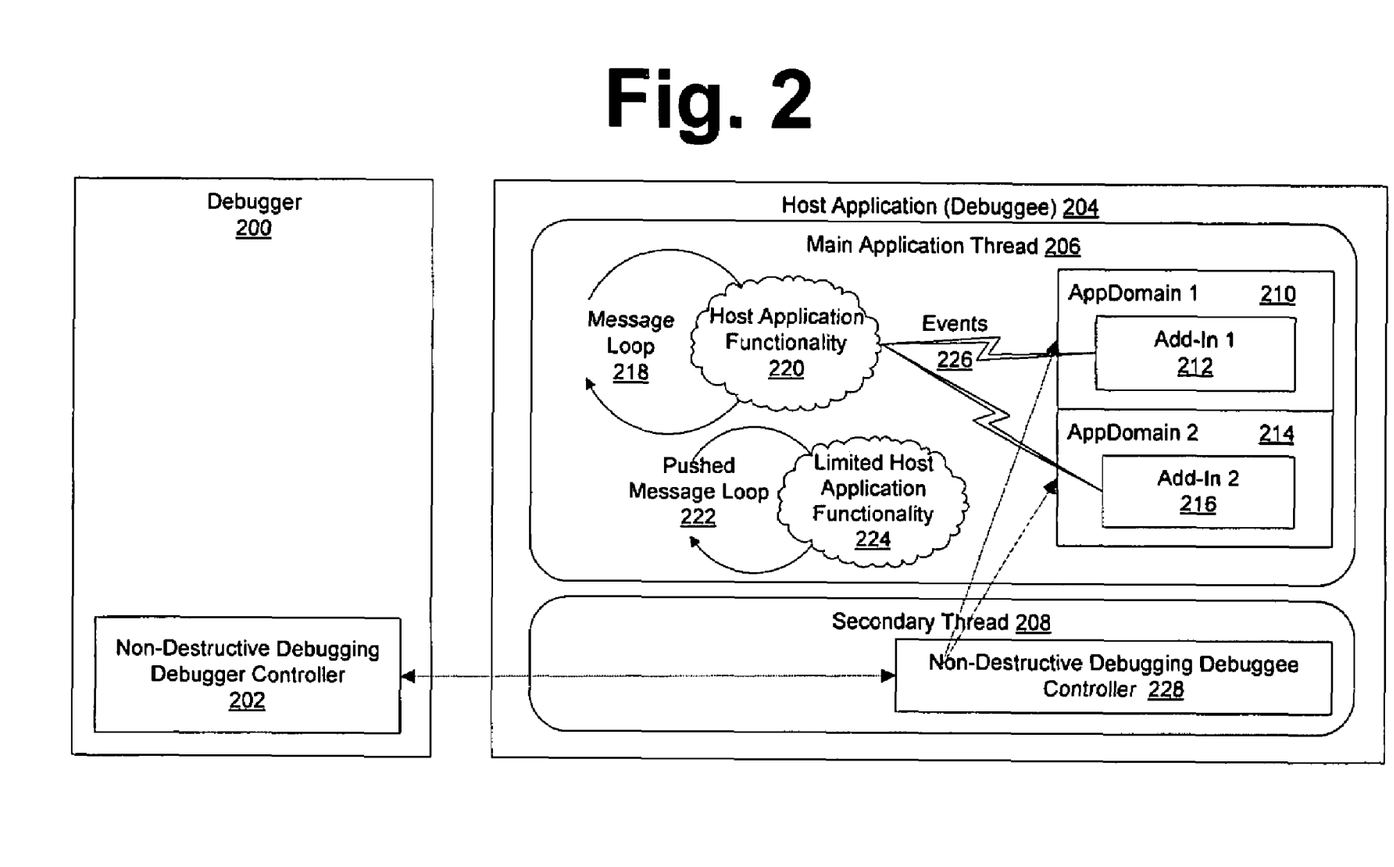
FIG. 2 illustrates an exemplary debugging architecture in accordance with the present invention.

Referring now to FIG. 2, there is illustrated an exemplary architecture in accordance with the present invention. A debugger 200 includes a non-destructive debugging (NDD) debugger controller 202. A host application 204 has a main message loop 218 that processes operating system messages and invokes the host application functionality 220. The host application functionality 220 can raise events that are handled by add-ins (212 and 216) which are each loaded into their own isolated environment 210 and 214, respectively (e.g., a .NET AppDomain). The isolated environment provides isolation so one add-in can be unloaded without affecting other add-ins or the host application 204. While two isolated environments are illustrated in FIG. 2, additional or fewer isolated environments may be implemented.

While the isolated environments 210 and 214 are shown running on a main application thread 206, the isolated environments 210 and 214 may run on their own threads. This alternative embodiment simplifies some aspects of NDD debugger 202 shutdown.

The host application functionality 220 and add-ins run 212 and 216 on the main application thread 206. A NDD debugee controller 228 runs on a secondary thread 208. The secondary thread 208 is used because breaking managed code causes all threads containing an AppDomain (i.e., isolated environments 210 and 214) to halt. If no managed code was running on the main application thread 206, and message loops were being pushed to make sure that the thread remained responsive, then it is possible to implement the NDD debugee controller 228 on the main application thread 206. The debugee controller 228 holds pointers to each loaded isolated environment 210 and 214, which in turn contains an add-in (212 and 216, respectively). The debugee controller 228 also communicates with the debugger Non-Destructive Debugging Controller 202. A pushed message loop 22 invokes a limited host application functionality 224, which will be described below.

Figure 3:
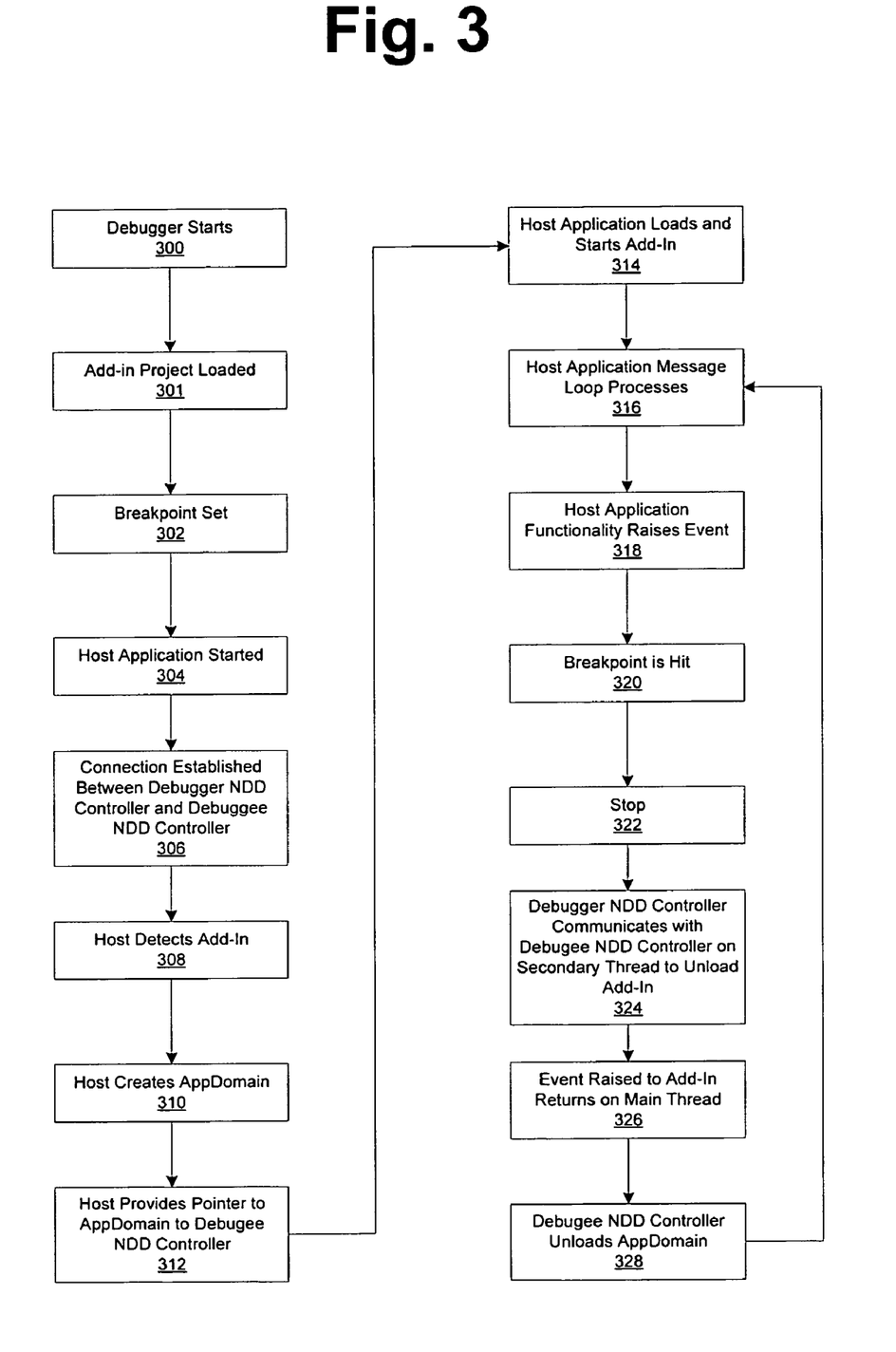
FIGS. 3-6 are processes performed by the present invention in exemplary debugging scenarios.
Figure 4:
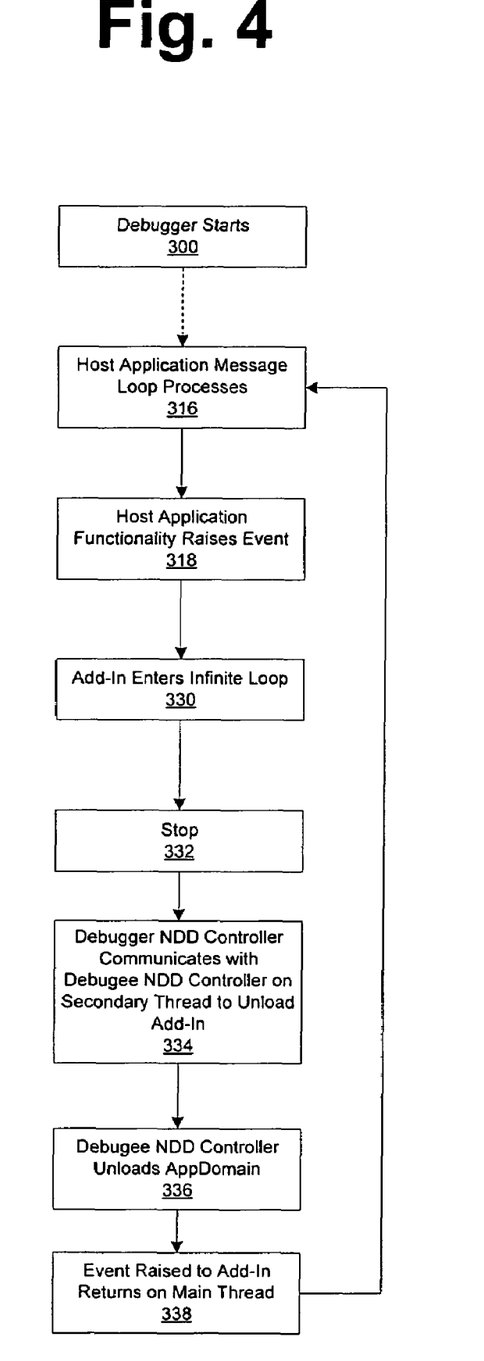

The operation of the present invention will now be described with reference to several scenarios and FIGS. 3-6. In a first and second scenario, the developer wishes to stop an add-in 212 without affecting the host application 204. Referring to FIG. 3, there is illustrated a variation of this scenario where a developer stops an add-in while at a break point. The present invention allows an add-in to be stopped and unloaded without affecting the host application. At step 300, the debugger 200 starts and, at step 301, the add-in project is loaded. At step 302, the developer may set a breakpoint and the host application 204 is started at step 304. At step 306, a connection established between the debugger NDD controller 202 and debugee NDD controller 228.

At step 308, the host application detects that the add-in should be loaded and an isolated environment for the add-in is created (step 310). At step 310, the host 204 provides a pointer to the isolated environment (e.g., 210) to debugee NDD controller 202. Next, the host application 204 loads and starts the add-in 210 (step 314). At step 316, the host application 204 processes the main message loop 216 and invokes the appropriate host application functionality 220.

At step 318, the host application functionality 220 raises an event 226 for the add-in, and at step 320, the breakpoint set a step 302 is hit as the developer steps through the add-in code. At step 322, the developer stops the host application by pressing, e.g., a stop button. At step 324, the debugger NDD controller 202 communicates with debugee NDD controller 228 on the secondary thread 208 to unload the add-in 212. At step 326, the event 226 raised to the add-in 212 returns on the main thread 206 as the add-in 212 has been unloaded. The process then returns to step 316 where the host application 204 message loop 218 continues to process.

FIG. 3 illustrates a related scenario where a developer tries to stop a runaway add-in, i.e., an add-in for which no breakpoint has been set, but which has entered an infinite loop or a long running operation that must be stopped. In accordance with the present invention, a runaway add-in can be stopped without affecting the host application. Steps 300-318 are performed as described above with regard to FIG. 2. Next, at step 330, the add-in enters an infinite loop and at step 332, the developer stops the host application by pressing, e.g., a stop button. At step 334, the debugger NDD controller 202 communicates with debugee NDD controller 228 on the secondary thread 208 to unload the add-in 212. At step 336, debugee NDD controller 228 uses the pointer to the isolated environment 210 to unload the isolated environment 210. At step 338, the event 226 raised to the add-in 212 returns on the main thread 206 as the add-in 212 has been unloaded. The process then returns to step 316 where the host application 204 message loop 218 continues to process.

Figure 5:
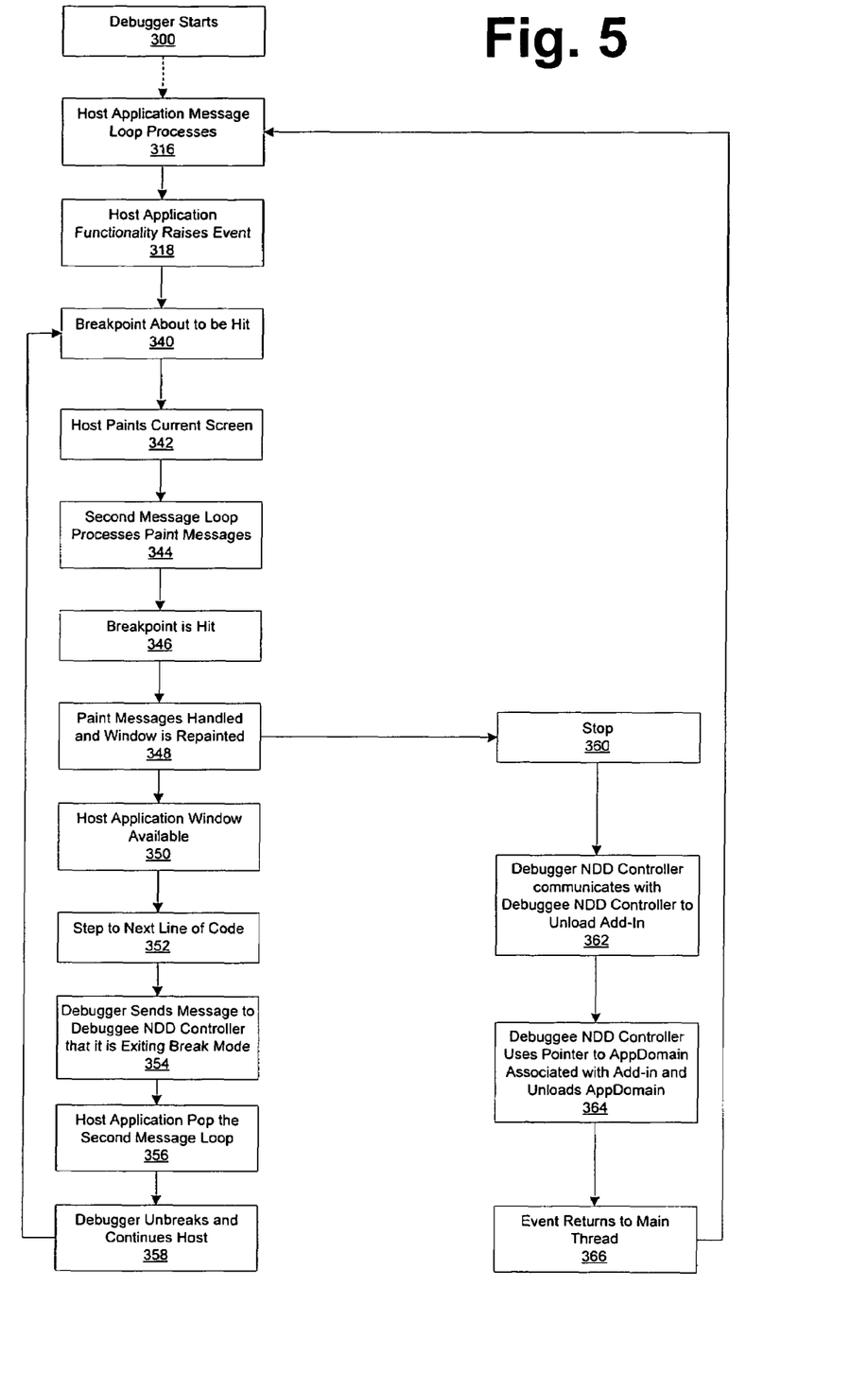

In another scenario, the present invention provides a mechanism by which the developer is able to step through Add-In code while the host application 204 continues to paint the window in which it is executing. FIG. 5 illustrates the processes performed in this scenario, where the host application 204 continues to paint even when the add-in 212 is stopped at a breakpoint or when the developer steps through the lines of code in the add-in. Steps 300-318 are performed as described with reference to FIG. 2. Prior to hitting the breakpoint (step 340), the NDD debugee controller 202 is notified so that the host application 204 can cache the current window image as a bitmap. When paint messages are processed while at a breakpoint, the cached bitmap can be used to paint the window (step 342). This bitmap cache is desirable because it advantageously minimizes the code that runs while the add-in is stopped at a breakpoint.

The host application 204 also pushes the second message loop 222 that processes painting messages while the add-in is stopped at a breakpoint (steps 344-348). This message loop 222, for example, processes operating system messages that ask the application to repaint itself. The add-in also might participate in the painting of the window so it is important to cache the painted state of the window before the breakpoint is hit so that the host application does not need to invoke the add-in while it is stopped at a breakpoint.

After the debugger breaks on the breakpoint, the developer can switch to the host application window and see the state of the application 204 as the second message loop 222 allows the host application 204 to paint its window (step 350). When the developer moves from the breakpoint (step 352), the host application is notified so it can pop the second message loop 222 allowing the primary message loop 218 to process messages and invoke the full application functionality (steps 354-356). With the message loop 222 popped, the debugger 200 continues the process and the next line of add-in code is run. If the developer is stepping, the debugger 200 will unbreak (step 358) and break again after the next line of code is run, repeating steps 340-356 and the process of pushing a second message loop.

At step 348, the host application may be stopped, e.g., when the developer presses a stop button (step 360). At step 362, the debugger NDD controller 202 communicates with debugee NDD controller 228 on the secondary thread 208 to unload the add-in 212. At step 364, debugee NDD controller 228 uses the pointer to the isolated environment 210 to unload the isolated environment 210. At step 366, event 226 raised to the add-in 212 returns on the main thread 206 as the add-in 212 has been unloaded. The process then returns to step 316 where the host application 204 message loop 218 continues to process.

Figure 6:
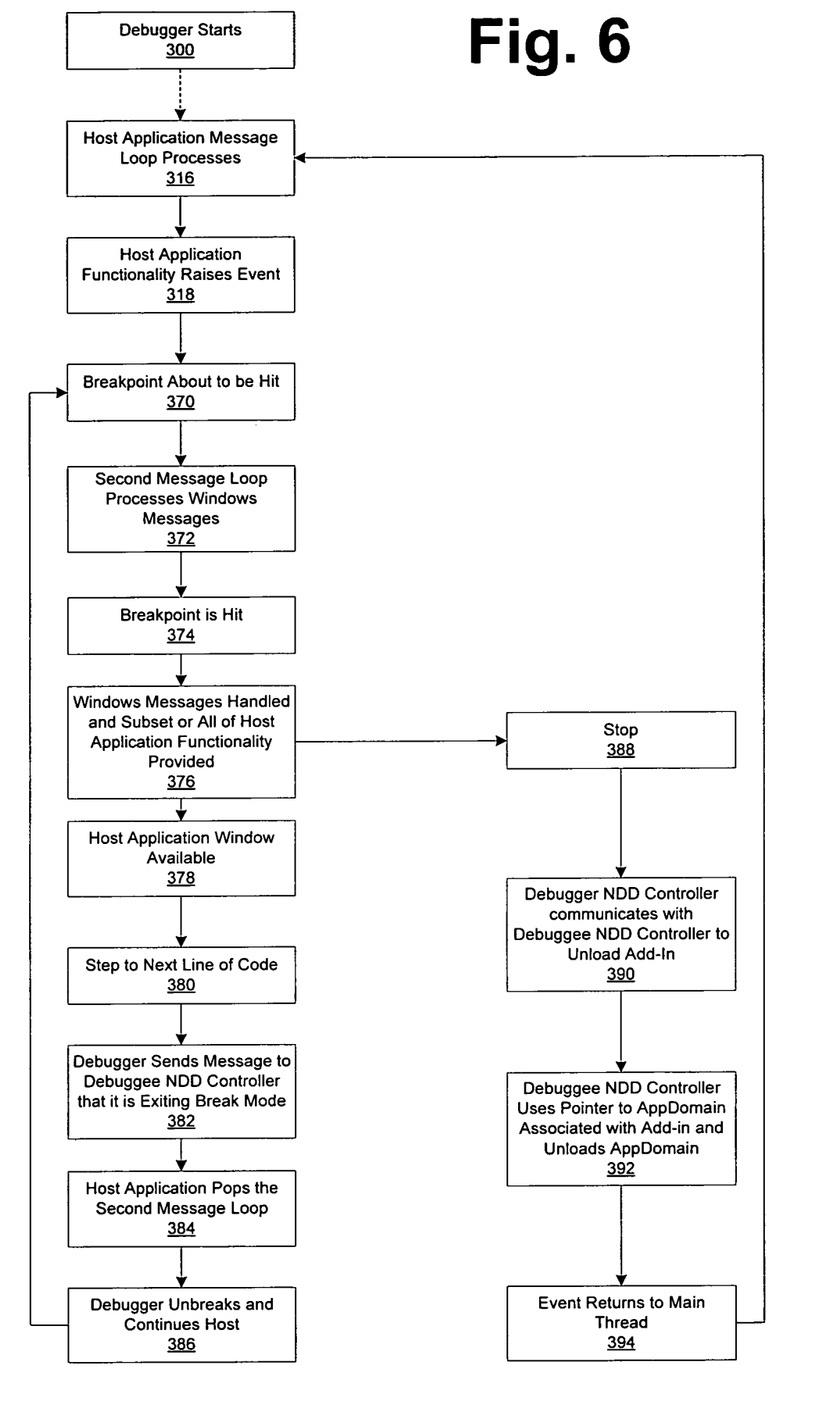

In yet another scenario, the present invention allows limited or full interaction with the host application 204 when the Add-In code is stopped at a break point. The processes associated with this scenario are shown in FIG. 6. Steps 300-318 are performed as described with reference to FIG. 2. The pushed message loop 222 and the limited application functionality 224 allow some subset of application functionality or all application functionality. Therefore, the host application 204 can continue to work when the add-in is stopped at a breakpoint.

At step 370, a breakpoint is about to be hit. Prior to hitting the breakpoint, the NDD debugee controller 228 is notified so that the host application 204 can push the second message loop 222 (step 372). This message loop 222 can invoke a subset of application functionality or all application functionality 224. As an example of a subset of application functionality, the hosting application may run in a state where it responds to user interaction but does not invoke add-in functionality or raise events to add-ins as the add-in may be stopped at a breakpoint and cannot run. The host application 204 is able to push the second message loop 222 that can process messages while the add-in is stopped at a breakpoint.

When the debugger breaks at the breakpoint (step 374), the developer can switch to the host application window and interact with the application subject to any limitations imposed by the second message loop 222 (steps 376-378). When the host application 204 moves off the breakpoint (step 380), the host application 204 is notified so it can pop the second message loop 222 allowing the primary message loop 218 to process messages and invoke the full application functionality (step 382). With the message loop 222 is popped (step 384), the debugger 200 continues the process and the next line of add-in code is run. If the developer is stepping, the debugger 200 unbreak (step 386), and will repeat steps 370-384 to break again after the next line of code is run and the process of pushing a second message loop 222 repeats.

At step 376, the host application may be stopped, e.g., when the developer presses a stop button (step 388). At step 390, the debugger NDD controller 202 communicates with debugee NDD controller 228 on the secondary thread 208 to unload the add-in 212. At step 392, debugee NDD controller 228 uses the pointer to the isolated environment 210 to unload the isolated environment 210. At step 394, event 226 raised to the add-in 212 returns on the main thread 206 as the add-in 212 has been unloaded. The process then returns to step 316 where the host application 204 message loop 218 continues to process.

While the present invention has been described in connection with the preferred embodiments of the various Figs., it is to be understood that other similar embodiments may be used or modifications and additions may be made to the described embodiment for performing the same function of the present invention without deviating therefrom. Furthermore, it should be emphasized that a variety of computer platforms, including handheld device operating systems and other application specific operating systems are contemplated, especially as the number of wireless networked devices continues to proliferate. Still further, the present invention may be implemented in or across a plurality of processing chips or devices, and storage may similarly be effected across a plurality of devices. Therefore, the present invention should not be limited to any single embodiment, but rather should be construed in breadth and scope in accordance with the appended claims.

What is claimed is:

1. A method of non-destructive debugging of an add-in, comprising:
starting a debugger;
starting a debugee host application including host application functionality executing in a main application thread on a computing device;
establishing a connection between a debugger controller associated with the debugger and a debugee controller associated with the debugee host application, the debugee controller running in a secondary thread of the debugee host application on the computing device;
loading said add-in into an isolated environment created therefor in the main application thread on the computing device and associated with said debugee host application, the isolated environment providing isolation so that the add-in can be unloaded from the main application thread without affecting any other add-in or the host application functionality in the main application thread;
raising an event handled by said add-in;
interacting, by the debugger, with the isolated environment of said add-in independently of the host application functionality of said debugee host application in response to the raised event, the interacting including the debugger controller communicating with the debugee controller to unload the add-in from the main application thread without killing the main application thread having the host application functionality; and
upon concluding debugging of the add-in, re-loading the add-in into the main application thread having the host application functionality and executing the host application with the re-loaded add-in in a normal, non-debugging context without the isolated environment.

2. The method of claim 1, further comprising unloading said add-in by unloading said isolated environment.

3. The method of claim 2, further comprising stopping said add-in from executing in an infinite loop.

4. The method of claim 1, further comprising processing operating system messages in a main message loop having associated therewith a host application functionality.

5. The method of claim 4, further comprising:
determining that a breakpoint will be hit; pushing a secondary message loop having associated therewith a limited application functionality; and
displaying a host application widow in which interaction with said debugee host application is provided when said add-in is at said breakpoint.

6. The method of claim 5, further comprising:
stopping execution of said add-in; and unloading said add-in from said debugee host application.

7. The method of claim 5, further comprising:
caching a host application screen state after determining that said breakpoint will be hit; and
processing operating system messages to redraw a window within which said debugee host application is running using said host application screen state.

8. The method of claim 5, further comprising said steps of determining, pushing and displaying for each breakpoint encountered by said debugger.

9. A computing system for non-destructive debugging of an add-in, comprising:
a computing device on which is instantiated a debugger;
a debugger controller associated with the debugger;
a computing device on which is instantiated a host application including host application functionality executing in a main application thread on such computing device; and
a debugee controller associated with said host application running on a secondary thread of such computing device, said add-in being loaded by said host application into an isolated environment created therefor in the main application thread on such computing device and associated with said host application, the isolated environment providing isolation so that the add-in can be unloaded from the main application thread without affecting any other add-in or the host application functionality in the main application thread, and said debugger stepping through code associated with the isolated environment of said add-in independently of the host application functionality of said host application, and in response to a raised event, the debugger controller communicating with the debugee controller to unload the add-in without killing the main application thread having the host application functionality;
the debugee controller, upon concluding debugging of the add-in, re-loading the add-in into the main application thread having the host application functionality and executing the host application with the re-loaded add-in in a normal, non-debugging context without the isolated environment.

10. The system of claim 9, wherein operating system messages are processed by said host application in a main message loop having associated therewith a host application functionality.

11. The system of claim 10, wherein when it is determined that a breakpoint will be hit, said host application pushes a secondary message loop having associated therewith a limited application functionality, and wherein a host application widow is displayed in which interaction with said host application is provided when said add-in is at said breakpoint.

12. The system of claim 11, wherein execution of said add-in is stopped by unloading said add-in from said host application.

13. The system of claim 11, wherein a host application screen state is cached after determining that said breakpoint will be hit, and wherein operating system messages to redraw a window within which said host application is running are processed using said host application screen state.

14. A computer readable storage medium having computer executable instructions stored thereon for non-destructive debugging of an add-in, said instructions for performing the method comprising:
starting a debugee host application including host application functionality executing in a main application thread on a computing device;
establishing a connection between a debugger controller associated with a debugger and a debugee controller associated with the debugee host application, the debugee controller running in a secondary thread of the debugee host application on the computing device;
loading said add-in into an isolated environment created therefor in the main application thread on the computing device and associated with said debugee host application, the isolated environment providing isolation so that the add-in can be unloaded from the main application thread without affecting any other add-in or the host application functionality in the main application thread;
raising an event handled by said add-in;

interacting, by the debugger, with the isolated environment of said add-in independently of the host application functionality of said debugee host application in response to the raised event, the interacting including the debugger controller communicating with the debugee controller to unload the add-in from the main application thread without killing the main application thread having the host application functionality; and upon concluding debugging of the add-in re-loading the add-in into the main application thread having the host application functionality and executing the host application with the re-loaded add-in in a normal, non-debugging context without the isolated environment.

15. The computer readable storage medium of claim 14, further comprising instructions for unloading said add-in by unloading said isolated environment.

16. The computer readable storage medium of claim 15, further comprising instructions for stopping said add-in from executing in an infinite loop.

17. The computer readable storage medium of claim 14, further comprising instructions for processing operating system messages in a main message loop having associated therewith a host application functionality.

18. The computer readable storage medium of claim 17, further comprising instructions for:
   determining that a breakpoint will be hit;
   pushing a secondary message loop having associated therewith a limited application functionality; and
   displaying a host application widow in which interaction with said debugee host application is provided when said add-in is at said breakpoint.

19. The computer readable storage medium of claim 18, further comprising instructions for:
   stopping execution of said add-in; and
   unloading said add-in from said debugee host application.

20. The computer readable storage medium of claim 18, further comprising instructions for:
   caching a host application screen state after determining that said breakpoint will be hit; and
   processing operating system messages to redraw a window within which said debugee host application is running using said host application screen state.

* * * * *